(12) United States Patent
Wang et al.

(10) Patent No.: US 9,648,601 B2
(45) Date of Patent: May 9, 2017

(54) COMMUNICATION METHOD, BASE STATION AND USER EQUIPMENT USING A SET OF LEGACY OR AGGRESSIVE CQI TABLE AND LEGACY OR AGGRESSIVE MCS TABLE

(75) Inventors: Lilei Wang, Beijing (CN); Ming Xu, Beijing (CN); Masayuki Hoshino, Kanagawa (JP); Akihiko Nishio, Osaka (JP)

(73) Assignee: Sun Patent Trust, New York, NY (US)

( * ) Notice: Subject to any disclaimer, the term of this patent is extended or adjusted under 35 U.S.C. 154(b) by 151 days.

(21) Appl. No.: 14/416,174

(22) PCT Filed: Aug. 24, 2012

(86) PCT No.: PCT/CN2012/080560
§ 371 (c)(1),
(2), (4) Date: Jan. 21, 2015

(87) PCT Pub. No.: WO2014/029108
PCT Pub. Date: Feb. 27, 2014

(65) Prior Publication Data
US 2015/0163773 A1 Jun. 11, 2015

(51) Int. Cl.
*H04W 72/04* (2009.01)
*H04L 5/00* (2006.01)
(Continued)

(52) U.S. Cl.
CPC ........... *H04W 72/042* (2013.01); *H04L 1/003* (2013.01); *H04L 1/0016* (2013.01);
(Continued)

(58) Field of Classification Search
CPC .. H04W 72/042; H04W 88/08; H04L 5/0057; H04L 1/0009
See application file for complete search history.

(56) References Cited

U.S. PATENT DOCUMENTS 7,970,001 B2    6/2011  Hoshino et al.
8,040,912 B2   10/2011  Imamura et al.
(Continued)

FOREIGN PATENT DOCUMENTS

CN    101438527 A    5/2009
CN    101536320 A    9/2009
(Continued)

OTHER PUBLICATIONS

3GPP TS 36.213 V10.5.0, "3rd Geeneration Partnership Project; Technical Specification Group Radio Access Network; Evolved Universal Terrestrial Radio Access (E-UTRA); Physical layer procedures (Release 10)," Mar. 2012, 125 pages.
(Continued)

*Primary Examiner* — Jackie Zuniga Abad
(74) *Attorney, Agent, or Firm* — Seed IP Law Group LLP

(57) ABSTRACT

The present disclosure provides a communication method, base station and user equipment for configuring a parameter table in a wireless communication system including a base station and a user equipment, the communication method comprising: defining at both the base station and the user equipment a parameter table which includes whole entries of a legacy parameter table and extended entries; and transmitting from the base station to the user equipment a bitmap indication which indicates a sub-table selected from the parameter table, wherein the number of the entries in the sub-table is the same as in the legacy parameter table.

17 Claims, 13 Drawing Sheets

(51) Int. Cl.
   *H04L 1/00* (2006.01)
   *H04W 88/02* (2009.01)
   *H04W 88/08* (2009.01)

(52) U.S. Cl.
   CPC .......... *H04L 1/0026* (2013.01); *H04L 1/0029* (2013.01); *H04L 1/0035* (2013.01); *H04L 5/0057* (2013.01); *H04L 1/0003* (2013.01); *H04L 1/0009* (2013.01); *H04W 88/02* (2013.01); *H04W 88/08* (2013.01)

(56) References Cited

U.S. PATENT DOCUMENTS

| | | | |
|---|---|---|---|
| 8,139,547 | B2 | 3/2012 | Hoshino et al. |
| 8,160,087 | B2 | 4/2012 | Hoshino et al. |
| 8,406,189 | B2 | 3/2013 | Hoshino et al. |
| 8,699,960 | B2 | 4/2014 | Pi et al. |
| 9,166,736 | B2 | 10/2015 | Imamura et al. |
| 2006/0287743 | A1 | 12/2006 | Sampath et al. |
| 2007/0259671 | A1 | 11/2007 | Cheng et al. |
| 2009/0141648 | A1 | 6/2009 | Imamura et al. |
| 2009/0163142 | A1 | 6/2009 | Pi et al. |
| 2010/0208606 | A1 | 8/2010 | Hoshino et al. |
| 2011/0096690 | A1 | 4/2011 | Hoshino et al. |
| 2011/0096691 | A1 | 4/2011 | Hoshino et al. |
| 2011/0211482 | A1 | 9/2011 | Hoshino et al. |
| 2011/0235604 | A1 | 9/2011 | Inoue et al. |
| 2012/0008517 | A1 | 1/2012 | Imamura et al. |
| 2012/0182899 | A1 | 7/2012 | Mujtaba et al. |
| 2013/0208606 | A1* | 8/2013 | Merlin ................. H04L 1/0025 370/252 |
| 2014/0211635 | A1 | 7/2014 | Pi et al. |
| 2015/0016553 | A1 | 1/2015 | Yang et al. |
| 2015/0036590 | A1* | 2/2015 | Lahetkangas ......... H04L 1/0003 370/328 |

FOREIGN PATENT DOCUMENTS

| | | |
|---|---|---|
| CN | 101674149 A | 3/2010 |
| CN | 102624481 A | 8/2012 |
| EP | 1 903 692 A1 | 3/2008 |
| EP | 2 073 417 A2 | 6/2009 |
| EP | 2 811 676 A1 | 12/2014 |
| JP | 2011-142664 A | 7/2011 |
| JP | 4823225 B2 | 11/2011 |
| WO | 2010/061825 A1 | 6/2010 |

OTHER PUBLICATIONS

International Search Report dated Jun. 6, 2013, for corresponding International Application No. PCT/CN2012/080560, 4 pages.
Extended European Search Report, dated Apr. 14, 2016, for corresponding EP Application No. 12883201.1-1874 / 2888827, 10 pages.

* cited by examiner

| CQI index | modulation | code rate x 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.377 |
| 4 | QPSK | 308 | 0.6016 |
| 5 | QPSK | 449 | 0.877 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Fig.1
(Prior Art)

| Subband differential CQI value | Offset level |
|---|---|
| 0 | 0 |
| 1 | 1 |
| 2 | $\geq 2$ |
| 3 | $\leq -1$ |

Fig.2
(Prior Art)

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | |
| 30 | 4 | |
| 31 | 6 | Reserved |

Fig.3
(Prior Art)

| CQI index | modulation | code rate x 1024 | efficiency | bitmap1 | bitmap2 | bitmap3 |
|---|---|---|---|---|---|---|
| 0 | | out of range | | 1 | 1 | 1 |
| 1 | QPSK | 78 | 0.1523 | 1 | 1 | 1 |
| 2 | QPSK | 120 | 0.2344 | 1 | 0 | 0 |
| 3 | QPSK | 193 | 0.377 | 1 | 1 | 0 |
| 4 | QPSK | 308 | 0.6016 | 1 | 0 | 1 |
| 5 | QPSK | 449 | 0.877 | 1 | 1 | 0 |
| 6 | QPSK | 602 | 1.1758 | 1 | 0 | 0 |
| 7 | 16QAM | 378 | 1.4766 | 1 | 1 | 1 |
| 8 | 16QAM | 490 | 1.9141 | 1 | 0 | 0 |
| 9 | 16QAM | 616 | 2.4063 | 1 | 1 | 0 |
| 10 | 64QAM | 466 | 2.7305 | 1 | 1 | 0 |
| 11 | 64QAM | 567 | 3.3223 | 1 | 0 | 1 |
| 12 | 64QAM | 666 | 3.9023 | 1 | 1 | 0 |
| 13 | 64QAM | 772 | 4.5234 | 1 | 1 | 0 |
| 14 | 64QAM | 873 | 5.1152 | 1 | 1 | 0 |
| 15 | 64QAM | 948 | 5.5547 | 1 | 1 | 0 |
| 16 | 256QAM | 720 | 5.6250 | 0 | 1 | 1 |
| 17 | 256QAM | 750 | 5.8594 | 0 | 1 | 1 |
| 18 | 256QAM | 770 | 6.0156 | 0 | 1 | 1 |
| 19 | 256QAM | 800 | 6.2500 | 0 | 1 | 1 |
| 20 | 256QAM | 820 | 6.4063 | 0 | 1 | 1 |
| 21 | 256QAM | 840 | 6.5625 | 0 | 0 | 1 |
| 22 | 256QAM | 860 | 6.7188 | 0 | 0 | 1 |
| 23 | 256QAM | 880 | 6.8750 | 0 | 0 | 1 |
| 24 | 256QAM | 900 | 7.0313 | 0 | 0 | 1 |
| 25 | 256QAM | 920 | 7.1875 | 0 | 0 | 1 |
| 26 | 256QAM | 940 | 7.3438 | 0 | 0 | 1 |
| .... | | | | | | |

Fig.8

| Subband differential CQI value | Offset level | bitmap1 | bitmap2 |
|---|---|---|---|
| 0 | 0 | 1 | 0 |
| 1 | 1 | 1 | 0 |
| 2 | ≥2 | 1 | 0 |
| 3 | ≤-1 | 1 | 0 |
| 4 | <=4 | 0 | 1 |
| 5 | 5 | 0 | 1 |
| 6 | 6 | 0 | 1 |
| 7 | >=7 | 0 | 1 |
| ... | | | |

Fig.9a

| Subband differential CQI value | Offset level | bitmap1 | bitmap2 |
|---|---|---|---|
| 0 | -2 | 0 | 0 |
| 1 | -1 | 1 | 0 |
| 2 | 0 | 1 | 0 |
| 3 | 1 | 1 | 0 |
| 4 | 2 | 1 | 0 |
| 5 | 3 | 0 | 0 |
| 6 | 4 | 0 | 1 |
| 7 | 5 | 0 | 1 |
| 8 | 6 | 0 | 1 |
| 9 | 7 | 0 | 1 |
| 10 | 8 | 0 | 0 |
| ... | | | |

Automatically forming a closed set

| Subband differential CQI value | Offset level |
|---|---|
| 0 | <=4 |
| 1 | 5 |
| 2 | 6 |
| 3 | >=7 |

| Subband differential CQI value | Offset level |
|---|---|
| 0 | <=-1 |
| 1 | 0 |
| 2 | 1 |
| 3 | >=2 |

Fig.9b

Option 1

| MCS Index $I_{MCS}$ | Modulation $Q_m$ order | TBS Index $I_{TBS}$ | bitmap1 | bitmap2 | bitmap3 |
|---|---|---|---|---|---|
| 0 | 2 | 0 | 1 | 1 | 1 |
| 1 | 2 | 1 | 1 | 1 | 0 |
| 2 | 2 | 2 | 1 | 0 | 1 |
| 3 | 2 | 3 | 1 | 1 | 0 |
| 4 | 2 | 4 | 1 | 0 | 0 |
| 5 | 2 | 5 | 1 | 1 | 1 |
| 6 | 2 | 6 | 1 | 0 | 0 |
| 7 | 2 | 7 | 1 | 1 | 0 |
| 8 | 2 | 8 | 1 | 0 | 0 |
| 9 | 2 | 9 | 1 | 1 | 0 |
| 10 | 4 | 9 | 1 | 1 | 0 |
| 11 | 4 | 10 | 1 | 1 | 1 |
| 12 | 4 | 11 | 1 | 1 | 0 |
| 13 | 4 | 12 | 1 | 1 | 1 |
| 14 | 4 | 13 | 1 | 1 | 0 |
| 15 | 4 | 14 | 1 | 1 | 1 |
| 16 | 4 | 15 | 1 | 1 | 1 |
| 17 | 6 | 15 | 1 | 1 | 1 |
| 18 | 6 | 16 | 1 | 1 | 1 |
| 19 | 6 | 17 | 1 | 1 | 1 |
| 20 | 6 | 18 | 1 | 1 | 1 |
| 21 | 6 | 19 | 1 | 1 | 1 |
| 22 | 6 | 20 | 1 | 1 | 1 |
| 23 | 6 | 21 | 1 | 1 | 1 |
| 24 | 6 | 22 | 1 | 1 | 1 |
| 25 | 6 | 23 | 1 | 1 | 1 |
| 26 | 6 | 24 | 1 | 1 | 1 |
| 27 | 6 | 25 | 1 | 1 | 1 |
| 28 | 6 | 26 | 1 | 1 | 1 |
| 29 | 2 | ▓ | 1 | 1 | 1 |
| 30 | 4 | ▓ | 1 | 1 | 1 |
| 31 | 6 | ▓ | 1 | 1 | 1 |
| 32 | 8 | ▓ | 0 | 1 | 1 |
| 33 | 8 | 27 | 0 | 1 | 1 |
| 34 | 8 | 28 | 0 | 1 | 1 |
| 35 | 8 | 29 | 0 | 1 | 1 |
| 36 | 8 | 30 | 0 | 0 | 1 |
| 37 | 8 | 31 | 0 | 0 | 1 |
| 38 | 8 | 32 | 0 | 0 | 1 |
| 39 | 8 | 33 | 0 | 0 | 1 |
| 40 | 8 | 34 | 0 | 0 | 1 |
| 41 | 8 | 35 | 0 | 0 | 1 |

Fig.10a

Option 2

| MCS Index $I_{MCS}$ | Modulation $Q_m$ order | TBS Index $I_{TBS}$ | bitmap1 | bitmap2 | bitmap3 |
|---|---|---|---|---|---|
| 0 | 2 | 0 | 1 | 1 | 1 |
| 1 | 2 | 1 | 1 | 1 | 0 |
| 2 | 2 | 2 | 1 | 0 | 1 |
| 3 | 2 | 3 | 1 | 1 | 0 |
| 4 | 2 | 4 | 1 | 0 | 0 |
| 5 | 2 | 5 | 1 | 1 | 1 |
| 6 | 2 | 6 | 1 | 0 | 0 |
| 7 | 2 | 7 | 1 | 1 | 0 |
| 8 | 2 | 8 | 1 | 0 | 0 |
| 9 | 2 | 9 | 1 | 1 | 0 |
| 10 | 4 | 9 | 1 | 1 | 0 |
| 11 | 4 | 10 | 1 | 1 | 1 |
| 12 | 4 | 11 | 1 | 1 | 0 |
| 13 | 4 | 12 | 1 | 1 | 1 |
| 14 | 4 | 13 | 1 | 1 | 0 |
| 15 | 4 | 14 | 1 | 1 | 1 |
| 16 | 4 | 15 | 1 | 1 | 1 |
| 17 | 6 | 15 | 1 | 1 | 1 |
| 18 | 6 | 16 | 1 | 1 | 1 |
| 19 | 6 | 17 | 1 | 1 | 1 |
| 20 | 6 | 18 | 1 | 1 | 1 |
| 21 | 6 | 19 | 1 | 1 | 1 |
| 22 | 6 | 20 | 1 | 1 | 1 |
| 23 | 6 | 21 | 1 | 1 | 1 |
| 24 | 6 | 22 | 1 | 1 | 1 |
| 25 | 6 | 23 | 1 | 1 | 1 |
| 26 | 6 | 24 | 1 | 1 | 1 |
| 27 | 6 | 25 | 1 | 1 | 1 |
| 28 | 6 | 26 | 1 | 1 | 1 |
| 29 | 2 | ▓ | 1 | 1 | 1 |
| 30 | 4 | ▓ | 1 | 1 | 1 |
| 31 | 6 | ▓ | 1 | 1 | 1 |
| 32 | 8 | 27 | 0 | 1 | 1 |
| 33 | 8 | 28 | 0 | 1 | 1 |
| 34 | 8 | 29 | 0 | 1 | 1 |
| 35 | 8 | 30 | 0 | 0 | 1 |
| 36 | 8 | 31 | 0 | 0 | 1 |
| 37 | 8 | 32 | 0 | 0 | 1 |
| 38 | 8 | 33 | 0 | 0 | 1 |
| 39 | 8 | 34 | 0 | 0 | 1 |
| 40 | 8 | 35 | 0 | 0 | 1 |
| 41 | 8 | ▓ | 0 | 1 | 1 |

Fig.10b

| Mode 9 | DCI format 1A | Common and<br><br>UE specific by C-RNTI | Non-MBSFN subframe: If the number of PBCH antenna ports is one, Single-antenna port, port 0 is used (see subclause 7.1.1), otherwise Transmit diversity (see subclause 7.1.2)<br>MBSFN subframe: Single-antenna port, port 7 (see subclause 7.1.1) |
|---|---|---|---|
| | DCI format 2C | UE specific by C-RNTI | Up to 8 layer transmission, ports 7-14 (see subclause 7.1.5B) |
| Mode 9+ | DCI format 1A | Common and<br><br>UE specific by C-RNTI | Non-MBSFN subframe: If the number of PBCH antenna ports is one, Single-antenna port, port 0 is used (see subclause 7.1.1), otherwise Transmit diversity (see subclause 7.1.2)<br>MBSFN subframe: Single-antenna port, port 7 (see subclause 7.1.1) |
| | DCI format 2C+ | UE specific by C-RNTI | Up to 8 layer transmission, ports 7-14 (see subclause 7.1.5B) |

Fig.19

COMMUNICATION METHOD, BASE STATION AND USER EQUIPMENT USING A SET OF LEGACY OR AGGRESSIVE CQI TABLE AND LEGACY OR AGGRESSIVE MCS TABLE

TECHNICAL FIELD

The present disclosure relates to parameter table configuration technique in the communication field.

BACKGROUND ART

In 3GPP (3rd Generation Partnership Project) Rel.8/9/10 system, Channel Quality Indicator (CQI), one type of channel state information (CSI), is an important communication parameter used for scheduling and link adaptation at eNodeB (eNB). In practice, since UE (user equipment) knows better about the downlink channel based on certain reference signal, like CRS (common reference signal) or CSI-RS (channel state information-reference signal), CQI is calculated and recommended at UE side. Then, CQI is feedback by the UE with a certain index in the CQI table, which includes some combinations of modulation order and coding rate, referring to Table 7.2.3-1 in 3GPP TS 36.213 V10.5.0, which is entirely incorporated hereto by reference.

FIG. 1 shows the CQI table in TS 36.213. It can be seen from FIG. 1 that the standard CQI table, which may also be referred to as a legacy CQI table, includes 16 entries with indices from 0-15, corresponding to modulation schemes such as QPSK, 16QAM and 64QAM. Therefore, 4 bits are necessary to reflect a certain entry when the UE feedbacks a certain wideband CQI to the eNB.

As to other CQI types defined according to different feedback modes or transmission modes, such as subband CQI, spatial CQI or UE selected CQI, UE do not directly feedback the entry/index in the same CQI table as shown in FIG. 1. Instead, an implicit mechanism is used to feedback their CQI offset level from the wideband CQI value. For example, Subband differential CQI offset level=subband CQI index−wideband CQI index.

FIG. 2 shows the subband differential CQI table in TS 36.213. It can be seen that the standard subband differential CQI table, which may also be referred to as a legacy subband differential CQI table, includes 4 entries with indices from 0 to 3. Therefore, UE needs 2 additional bits to feedback the subband differential CQI offset level.

Also, Modulation Coding Scheme (MCS) is an important communication parameter in 3GPP Rel.8/9/10 system. MCS refers to which combination of modulation order and coding rate is used in physical transmission of downlink and uplink. There is also a table, called MCS table, restricts which combination of modulation order and transport block size could be used.

FIG. 3 shows the MCS table in TS 36.213. It can be seen that the standard MCS table, which may also be referred to as a legacy MCS table, includes 32 entries with indices from 0-31, corresponding to modulation orders such as 2, 4 and 6. The last three entries with indices 29-31 are used for re-transmission. In 3GPP, which MCS is used is informed in Downlink Control Information (DCI). And 5 bits are necessary for this indication.

SUMMARY OF THE DISCLOSURE

With the future introduction of new technologies and new network deployment, such as 3D beamforming, massive MIMO and dense deployment of small cell etc., user equipment has more opportunities to maintain high quality wireless channel link with high SINR, so it is possible and benefical for the system to support higher modulation orders than current system, like 256QAM or 1024QAM, in order to further improve the spectral efficiency and user throughput.

Correspondingly, there is a need to configure the parameter table, such as the CQI table or the MCS table described above, so that more entries corresponding to higher modulation orders and/or coding rates than those in the legacy tables can be indicated. There is also a need to configure the differential CQI table to indicate more CQI offset levels, so that the indication of the differential CQI can be more accurate.

The present disclosure is made in consideration of the above aspects.

According to one aspect of the present disclosure, there is provided a communication method of configuring a parameter table in a wireless communication system including a base station and a user equipment, comprising: defining at both the base station and the user equipment a parameter table which includes whole entries of a legacy parameter table and extended entries; and transmitting from the base station to the user equipment a bitmap indication which indicates a sub-table selected from the parameter table.

According to another aspect of the present disclosure, there is provided a communication method of configuring a parameter table in a wireless communication system including a base station and a user equipment, comprising: defining at both the base station and the user equipment multiple parameter tables which include at least a legacy parameter table and an aggressive parameter table which includes new modulation order related entries or new combinations of modulation order and coding rate; and transmitting from the base station to the user equipment an indication which indicates a parameter table selected from the multiple parameter tables, wherein the number of entries in any one of the multiple parameter tables is the same as in the legacy parameter table to keep signaling overhead unchanged.

According to a further aspect of the present disclosure, there is provided a communication method of configuring a parameter table in a wireless communication system including a base station and a user equipment, comprising: defining at both the base station and the user equipment a parameter table which includes whole entries of a legacy parameter table and extended entries; and transmitting from the base station to the user equipment an indication which indicates one entry of the parameter table, by legacy bits and at least one unused bit jointly.

According to a further aspect of the present disclosure, there is provided a communication method of configuring a parameter table in a wireless communication system including a base station and a user equipment, comprising: defining at both the base station and the user equipment a parameter table which includes whole entries of a legacy parameter table and extended entries; and transmitting from the base station to the user equipment an indication which indicates one entry of the parameter table by a number of bits, wherein the number of bits corresponds to the number of entries in the parameter table.

According to a further aspect of the present disclosure, there is provided a base station for configuring a parameter table in a wireless communication system including the base station and a user equipment, comprising: a storing unit which stores a pre-defined parameter table including whole entries of a legacy parameter table and extended entries; and a transmitting unit which transmits to the user equipment a bitmap indication which indicates a sub-table selected from the pre-defined parameter table, wherein the number of the entries in the subtable is the same as in the legacy parameter table.

According to a further aspect of the present disclosure, there is provided a user equipment for configuring a parameter table in a wireless communication system including a base station and the user equipment, comprising: a storing unit which stores a pre-defined parameter table including whole entries of a legacy parameter table and extended entries; and a receiving unit which receives from the base station a bitmap indication which indicates a sub-table selected from the pre-defined parameter table, wherein the number of the entries in the subtable is the same as in the legacy parameter table.

According to a further aspect of the present disclosure, there is provided a communication method of configuring different CQI tables for different CQI types considering wideband CQI is explicitely indicated by CQI table but other CQI type like spatial CQI, subband CQI or UE-selected CQI is implicitly indicated by subband differential CQI table.

According to a further aspect of the present disclosure, there is provided a communication method of configuring new parameter table in a wireless communication system including a base station and the user equipment, in which there is no half closed-interval definition for offset levels. Instead, only values have been defined in the table and the indicated values based on bitmap form the full closed-interval table automatically.

According to the communication methods and communication apparatuses of various aspects of the present disclosure, more entries than those in the legacy tables can be indicated. Thereby, higher modulation orders can be supported to adapt channel and improve spectral efficiency but without increasing the reported overhead.

BRIEF DESCRIPTION OF THE DRAWINGS

These and/or other aspects and advantages of the present disclosure will become more distinct and easier to be understood in a detailed description of embodiments of the present disclosure below in combination with attached drawings, in which:

FIG. 1 is a diagram showing the legacy CQI table in the conventional communication system;

FIG. 2 is a diagram showing the legacy subband differential CQI table in the conventional communication system;

FIG. 3 is a diagram showing the legacy MCS table in the conventional communication system;

FIG. 8 is a diagram schematically showing an extended CQI table and corresponding bitmap examples according to the first embodiment of the present disclosure;

FIGS. 9a and 9b are diagrams schematically showing two kinds of extended differential CQI tables and corresponding bitmap examples according to the first embodiment of the present disclosure;

FIGS. 10a and 10b are diagrams schematically showing two kinds of extended MCS tables based on positions of reserved entries and corresponding bitmap examples according to the first embodiment of the present disclosure;

FIG. 19 is a diagram schematically showing a new transmission format according to the fourth embodiment of the present disclosure.

DESCRIPTION OF THE EMBODIMENTS

Figure 4:
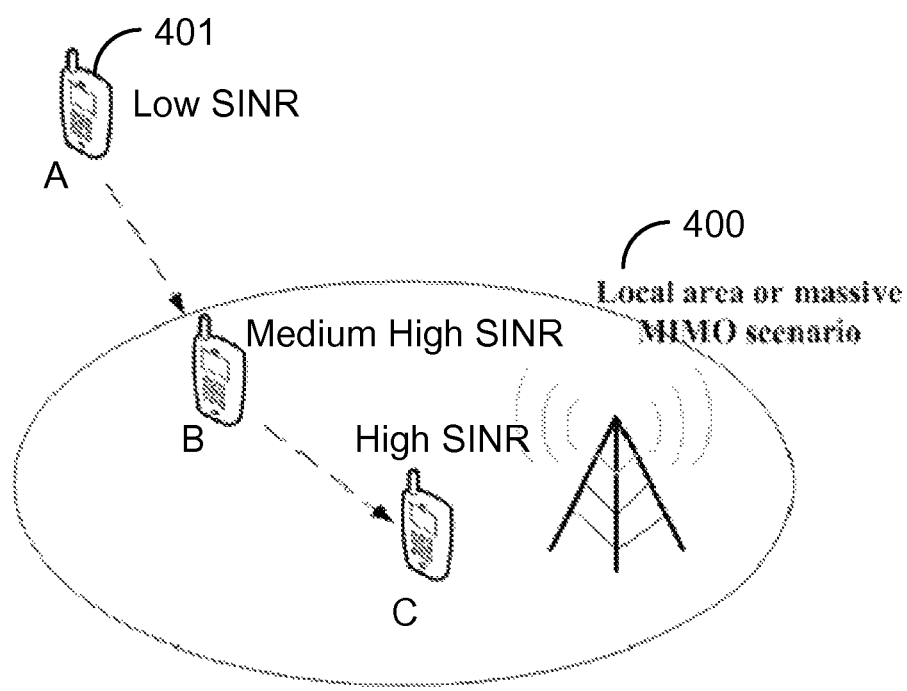
FIG. 4 is a diagram schematically showing communication scenarios where UE has different modulation/coding rate requirements at different positions.

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

(First Embodiment)

A communication method of configuring a parameter table in a wireless communication system including an eNode B and a UE is provided in the first embodiment of the present disclosure. The communication method comprises the steps of: defining at both the eNode B and the UE a parameter table which includes whole entries of a legacy parameter table and extended entries; and transmitting from the eNode B to the UE a bitmap indication which indicates a sub-table selected from the parameter table, wherein the number of the entries in the sub-table is the same as in the legacy parameter table.

Before the detailed explanation on the implementation of the communication method according to the first embodiment of the present disclosure, a description will be made to different communication scenarios of UE as well as different requirements on modulation order/coding rate, with reference to FIGS. 4-6.

FIG. 4 is a diagram schematically showing communication scenarios where UE has different modulation/coding rate requirements at different positions.

As shown in FIG. 4, UE 401 is in a local area or massive multiple-input-multiple-output (MIMO) scenario 400. It is found that UE 401 may have different requirements on modulation order/coding rate at different positions. For example, UE 401 will experience different signal-to-noise ratio (SINR) conditions when it is at different positions. Specially, if UE 401 is moving slowly from cell edge (e.g. position A) to a position (e.g. position B) closer to the cell center, and finally to the cell center (e.g. position C), it will experience low SINR, medium-high SINR and very high SINR conditions, respectively. Obviously, low SINR area needs a relatively lower effective coding rate, while high SINR area needs a relatively high effective coding rate.

Figure 5:
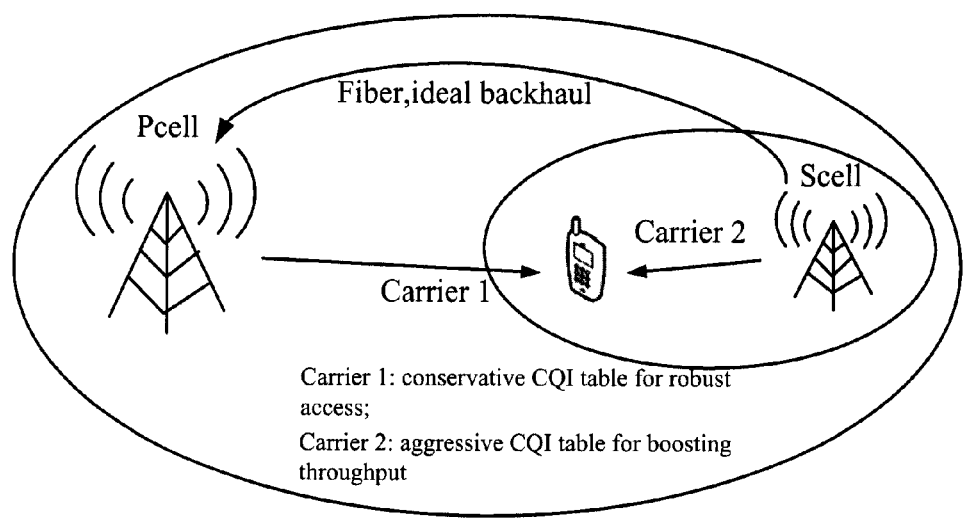
FIG. 5 is a diagram schematically showing communication scenarios where different carrier components (CCs) have different modulation/coding rate requirements.

FIG. 5 is a diagram schematically showing communication scenarios where different carrier components (CCs) have different modulation/coding rate requirement.

In the scenario of carrier aggregation (CA), as shown in FIG. 5, similarly, it is found that different CCs may also have different modulation/coding rate requirements due to different SINR/interference/channel conditions. For example, for CCs from Pcell to UE, such as carrier 1, there may be a requirement on a conservative CQI table (e.g. the legacy CQI table) for robust access; while for CCs from Scell to UE, such as carrier 2, there may be a requirement on an aggressive CQI table for boosting throughput.

Figure 6:
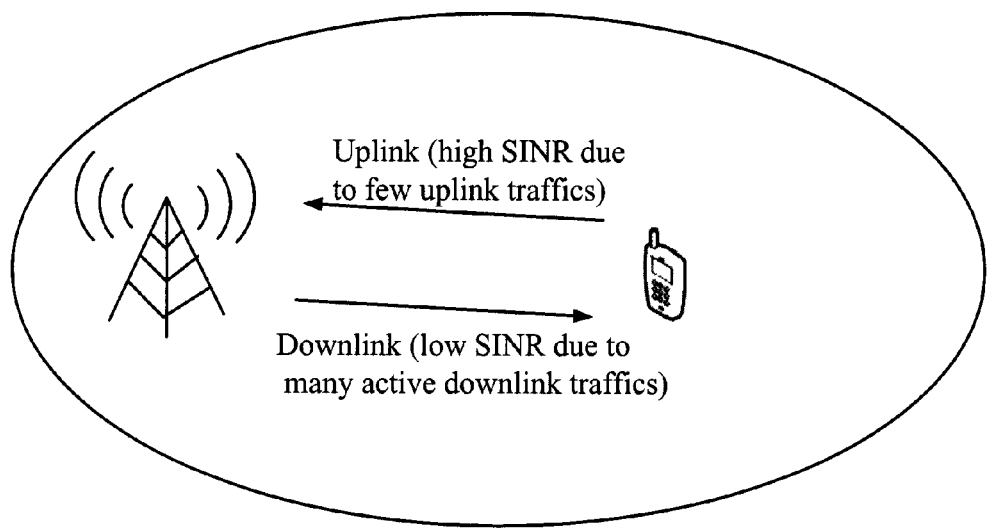
FIG. 6 is a diagram schematically showing communication scenarios where different links have different modulation/coding rate requirements.

FIG. 6 is a diagram schematically showing communication scenarios where different links have different modulation/coding rate requirement.

In the scenario of FIG. 6, similarly, it is found that uplink and downlink may have different modulation/coding rate requirements due to different SINR/interference/channel conditions. For example, for downlink transmissions, there may be a requirement on a conservative CQI table (e.g. the legacy CQI table) due to much active downlink traffic; while for uplink transmissions, there may be a requirement on an aggressive CQI table due to less uplink traffic, and hence high SINR.

From FIGS. 4-6, it is expected that different parameter tables, such as CQI/MCS table, which include special combinations of modulation order/coding rate, could be used in different SINR conditions to adapt different channel and get better performance. In other words, there is no need to apply the same parameter table for different communication scenarios. Only some entries in the parameter table may be enough in a certain communication scenario.

The communication method according to the first embodiment of the present disclosure is designed in view of the above analysis, in order to meet different modulation/coding rate requirements.

Now, a detailed description on the communication method according to the first embodiment of the present disclosure will be made with reference to FIG. 7.

Figure 7:
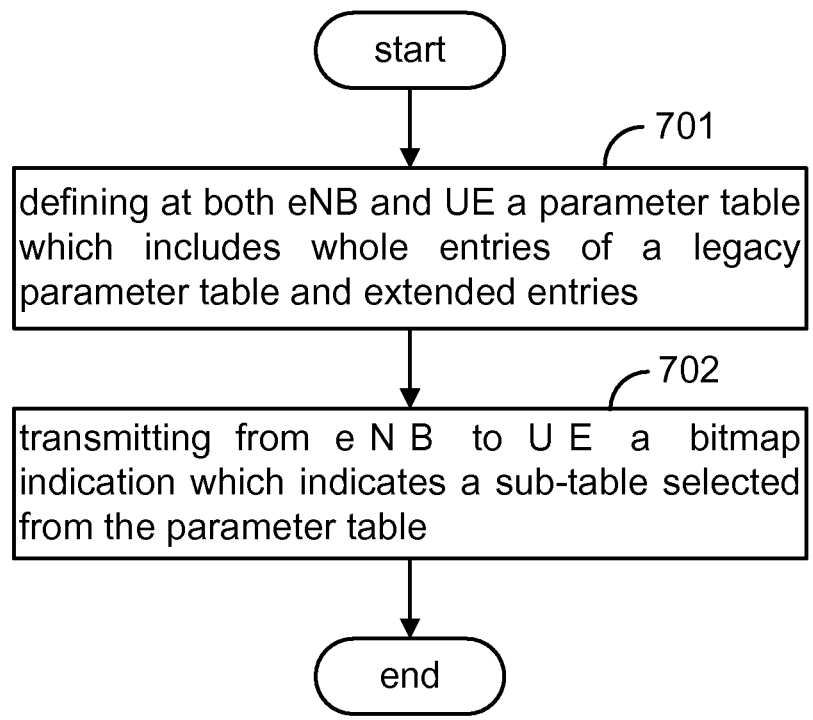
FIG. 7 is a flowchart showing an exemplary implementation of a communication method according to a first embodiment of the present disclosure.

FIG. 7 is a flowchart showing an exemplary implementation of the communication method according to the first embodiment of the present disclosure. The communication method according to the first embodiment is used for configuring a parameter table in a wireless communication system including an eNode B and a UE.

As shown in FIG. 7, the communication method starts at step 701, where a parameter table is defined at both the eNode B and the UE.

The parameter may be various communication parameters communicated between UE and eNode B. For example, the parameter may be CQI, differential CQI offset level and/or MCS. Correspondingly, the parameter table may be a CQI table, a differential CQI table or a MCS table.

In addition, the parameter table may include the whole entries of a legacy parameter table and some extended entries. The entries of the legacy parameter table may be standard entries defined in standards such as 3GPP TS 36.213, and they may correspond to communication scenarios where relatively conservative modulation orders/coding rates are required. The extended entries may be extended entries defined according to the first embodiment of the present disclosure, and they may correspond to communication scenarios where relatively aggressive modulation orders/coding rates are required.

Next, at step 702, the eNode B transmits to the UE a bitmap indication which indicates a sub-table selected from the parameter table.

Specially, the bitmap indication may be transmitted by the eNode B to the UE via a signaling in the upper layer or in the physical layer. For example, the bitmap indication may be transmitted via the Radio Resource Control (RRC) signaling semi-statically or implicitly triggered via bits in Downlink Control Information (DCI) format dynamically (specific configurations are via RRC signaling).

The bitmap may be used for indicating the sub-table selected from the parameter table. It should be noted that the number of the entries in the sub-table is the same as in the legacy parameter table, so that the signaling overhead related to the indication in the physical layer is kept unchanged.

The bitmap may be generated by the eNode B based on the communication scenarios of the wireless communication system as described above typically or any other suitable scenarios.

After the eNode B transmits to the UE the bitmap indication, both the eNode B and the UE are aware of the sub-table currently in use, so they may communicate an index of an entry in the parameter sub-table with each other. For example, for the CQI table, UE may report the CQI index to the eNode B based on the sub-table and eNB clearly know the exactly same table where UE is referring to. For the MCS table, the eNode B may inform the UE of the MCS index and UE assumes the same MCS table as that in eNB.

Moreover, since the extended parameter table comprises more entries than the legacy table, the method of the first embodiment of the present disclosure may further comprise a re-indexing process and a restoring process, which will be described later, to keep the feedback bits unchanged.

Next, a few examples will be given with reference to FIGS. 8-10 to better explain the principle of bitmap.

First, a description will be made to a case where the bitmap is applied to the CQI table. FIG. 8 is a diagram schematically showing an extended CQI table and corresponding bitmap examples according to the first embodiment of the present disclosure. The CQI table as shown in FIG. 8, which may also be referred to as the extended CQI table, includes 27 entries with indices from 0-26. Each entry corresponds to a certain CQI value with a corresponding modulation order and coding rate. It should be noted that the values of the entries and the number of the entries in the extended CQI table are only examples, and are not limited thereto.

Comparing with the legacy CQI table as shown in FIG. 1, it can be seen that the extended CQI table includes the whole entries with indices from 0-15 of the legacy CQI table, and new extended entries with indices from 16-26. Thus the number of the entries in the extended CQI table is more than that in the legacy CQI table.

According to the analysis as described above, for different communication scenarios, there is no need to apply the whole extended CQI table, and only some entries in the extended CQI table may be enough in a certain communication scenario.

For example, for UE at the edge of the cell (e.g. position A as shown in FIG. 4), it experiences a low SINR condition, and requires a CQI table with relatively conservative CQI values, i.e. relatively lower effective coding rates and/or relatively lower modulation orders. The method according to the first embodiment of the present disclosure may configure a sub-table (a conservative CQI table in this case) selected from the extended CQI table, with a bitmap as shown in column 801 of FIG. 8. Exemplarily, the value of "1" in the corresponding position of the bitmap may indicate, for example, the existence of the corresponding entry in the sub-table; while the value of "0" in the corresponding position of the bitmap may indicate, for example, the absence of the corresponding entry in the sub-table; or vice versa. It can be seen from the bitmap 801 that entries with lower effective coding rates and modulation orders (e.g., QPSK, 16QAM and 64QAM) are configured in this case.

For UE at a position closer to the middle of the cell than the edge (e.g. position B as shown in FIG. 4), it experiences a medium SINR condition, and requires a CQI table with relatively medium CQI values. The method according to the first embodiment of the present disclosure may configure a sub-table (a medium CQI table in this case) selected from the extended CQI table, with a bitmap as shown in column 802 of FIG. 8. It can be seen from the bitmap 802 that entries with medium effective coding rates and modulation orders are configured in this case.

Similarly, for UE at the center of the cell (e.g. position C as shown in FIG. 4), it experiences a high SINR condition, and requires a CQI table with relatively aggressive CQI values, i.e. relatively higher effective coding rates and/or relatively higher modulation orders. The method according to the first embodiment of the present disclosure may configure a sub-table (an aggressive CQI table in this case) selected from the extended CQI table, with a bitmap as shown in column 803 of FIG. 8. It can be seen from the bitmap 803 that more entries with higher effective coding rates and modulation orders, for example, 256QAM, are configured in this case. Also, a few entries with lower effective coding rates and modulation orders (e.g., QPSK) are configured to accommodate occasional cases.

It should be noted that the three bitmaps 801-803 are only examples, and those skilled in the art can configure the CQI table with different bitmaps according to the communication scenario.

It should also be noted that, for the extended CQI table, UE should re-order (re-index) the entries in the sub-table so that the index length is still the same as legacy CQI table. At eNB, it may restore the received index to the original index according to the bitmap.

For example, in FIG. 8, UE chooses CQI index 20 based on restriction of bitmap 2. Then, UE may re-index the original entries in the sub-table indicated by the bitmap 2, and the original index 20 will be changed to a new index 15 which will be feedback to eNB. eNB will restore the index 15 into the original index 20 based on the bitmap 2. So there is no ambiguity between eNB and UE. eNB always knows what kind of table UE is using currently based on the bitmap based configuration.

Therefore, it can be seen from FIG. 8 that more coding rates and modulation orders, for example, 256QAM or higher, are supported by the bitmap, and there is a flexibility to select certain coding rates and modulation orders in order to adapt different communication scenarios, thus achieving the best performance. But at the same time, the restriction is only used for wideband CQI. For other CQI types like spatial CQI or subband CQI, there is no need to restrict that. UE could utilize differential CQI offset level to feedback any entry or index in extended CQI table for spatial CQI or subband CQI. The details and examples would be introduced later.

Moreover, as described above, the bitmap indication may be transmitted by the eNode B to the UE via an upper layer signaling, such as the RRC signaling, which keeps the signaling overhead in the physical layer unchanged.

In addition, the number of entries in the CQI sub-table is 16, which is the same as that in the legacy CQI table, so that a good backward compatibility and overhead is ensured and only a small modification to the standard is needed.

Next, a description will be made to a case where the bitmap is applied to the differential CQI table. FIGS. 9a and 9b are diagrams schematically showing two kinds of extended differential CQI tables and corresponding bitmap examples according to the first embodiment of the present disclosure.

First, referring to FIG. 9a, the extended differential CQI table 901 includes the whole entries with indices from 0-3 of the legacy differential CQI table as shown in FIG. 2, and new extended entries with indices from 4-7. Similarly, the values of the entries and the number of the entries in the extended differential CQI table are only examples, and those skilled in the art may design an extended differential CQI table comprising more or less number of entries with different values. The option shown in FIG. 9a is direct extension and still keeps the legacy entries/values.

As shown in FIG. 9a, for relatively small offset levels, such as 2 dB, the method according to the first embodiment may configure a sub-table selected from the extended differential CQI table, with the bitmap 1 as shown in column 902 of FIG. 9a, which indicates the same entries as those in the legacy differential CQI table. For relatively large offset levels, such as 5 or 6 dB, the method according to the first embodiment may configure a sub-table selected from the extended differential CQI table, with the bitmap 2 as shown in column 903 of FIG. 9a, which indicates extended entries corresponding to large offset levels.

Option in FIG. 9a achieves a good backward compatibility. On the other hand, FIG. 9b is a differential CQI table completely redefined according to the first embodiment of the present disclosure, which includes entries totally different from those in the legacy differential CQI table. In FIG. 9b, no half-closed intervals as in the legacy differential CQI table have been defined. Instead, only some values have been defined. After indication of selected entries via bitmap, those values form closed-set automatically. For example, the method according to the first embodiment may configure a sub-table as shown in sub-table 908, with the bitmap 1 as shown in column 905. The method according to the first embodiment may also configure a sub-table as shown in sub-table 907, with the bitmap 2 as shown in column 906. The advantage of the extended differential CQI table like FIG. 9b is that it may be easier to further extend the differential CQI table to include more entries. In other words, it achieves a good forward compatibility, since only some new values instead of half-closed intervals are needed to be defined.

It should be noted that wideband CQI and subband/spatial/UE selected CQI do not need to use the same CQI table in the above descriptions. That is, the selection of a wideband CQI entry may be restricted to the CQI sub-table to keep overhead unchanged, but the selection of a subband/ spatial/UE selected CQI entry may not be restricted to the CQI sub-table and may be based on the whole extended CQI table. That is because the subband/spatial/UE selected CQI is indirectly reflected by a differential CQI offset level, instead of directly reflected by a real CQI value as described above.

In other words, when a subband differential CQI is to be reported as the parameter, the index of a subband differential CQI entry can be determined based on a CQI sub-table selected from an extended CQI table by the bitmap. Alternatively, the index of the subband differential CQI entry can be determined based on the whole extended CQI table.

For example, a wideband CQI may be restricted by bitmap 2 as shown in FIG. 8, and UE feedbacks a CQI index 16. But a subband CQI may not be restricted by the bitmap 2 and any entry in the whole extended CQI table could be used, even when it is not indicated by the bitmap 2, such as CQI index 22. So in this case UE only needs to feedback a CQI offset level 6 (22−16=6) based on the subband differential CQI table as shown in FIG. 9a or 9b.

That is, when a wideband CQI is to be reported as the parameter, the wideband CQI is determined based on a CQI sub-table selected from the extended CQI table by bitmap. when a spatial CQI, a subband CQI or a UE-selected CQI is to be reported as the parameter, the spatial CQI, the subband CQI or the UE-selected CQI is to be determined based on the following: (1) Wideband CQI, which is based on the extended CQI table, or the CQI sub-table selected from the extended CQI table; and (2) a differential CQI offset level based on sub-table, which is selected from the extended differential CQI offset level table by bitmap.

It should also be noted that a re-indexing and restoring process may be applied for the extended CQI table as described above. But for the differential CQI table, the re-indexing and restoring process may not be necessary. For example, if UE chooses CQI index 20 for wideband CQI and index 22 for subband CQI, then only the index 2 (based on differential CQI table) should be feedback.

With the extended differential CQI table according to the first embodiment of the disclosure, the feedback accuracy of differential CQI may be improved without an increase of signaling overhead.

Next, a description will be made to a case where the bitmap is applied to the MCS table. FIGS. 10a and 10b are diagrams schematically showing two kinds of extended MCS tables and corresponding bitmap examples according to the first embodiment of the present disclosure. The extended MCS table as shown in FIGS. 10a and 10b, includes 42 entries with indices from 0-41. Similarly, the values of the entries and the number of the entries in the extended MCS table are only examples, and are not limited thereto.

FIG. 10a and FIG. 10b show two different patterns based on different positions of reserved table for retransmission. eNB and UE should assume the same bitmap or selected table after the indication in order to avoid ambiguity. Furthermore, considering some initial state or handover state that UE will not know the configuration of MCS tables, legacy tables may be used in that cases. In those scenarios eNB generally uses DCI format 1A for downlink transmission. So the legacy MCS table may be used as default setting in DCI format 1A transmission. The extended MCS table may only be used for DCI format 2C or future formats.

Similarly, the bitmaps in FIGS. 10a and 10b are only examples, and those skilled in the art can configure the MCS table with different bitmaps according to the communication scenario.

The communication method according to the first embodiment of the present disclosure has been described above. According to the communication method, more entries corresponding to more modulation orders/coding rates than those in the legacy tables may be indicated by the bitmap. Thereby, higher modulation orders may be supported to adapt channel and improve spectral efficiency, and certain coding rates and modulation orders may be selected flexibly according to different communication scenarios, thus achieving the best performance.

Moreover, since the bitmap indication may be transmitted by eNode B to UE via an upper layer signaling, such as the RRC signaling, the signaling overhead in the physical layer may be kept unchanged.

In addition, the number of entries in the sub-table may be the same as that in the legacy parameter table, so that a good backward compatibility may be ensured and only a small modification to the standard is needed.

Hereinafter, the communication apparatus according to the first embodiment of the present disclosure will be described with reference to FIGS. 11-12. The communication apparatus may be a base station (which may also be referred to as eNode B or eNB) or a user equipment (UE), and locates in a wireless communication system comprising both the base station and the UE.

Figure 11:
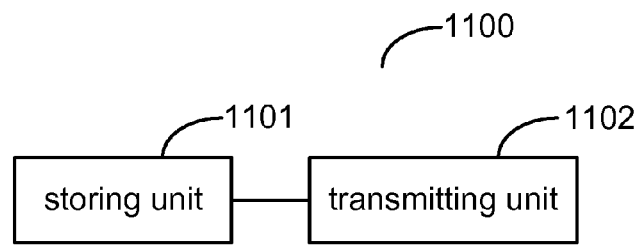
FIG. 11 is a diagram schematically showing the configuration of a base station according to the first embodiment of the present disclosure.

First, refer to FIG. 11, which schematically shows the configuration of a base station according to the first embodiment of the present disclosure. The base station 1100 according to the first embodiment is used to configure a parameter table. As shown in FIG. 11, the base station 1100 mainly comprises a storing unit 1101 and a transmitting unit 1102. Other parts of the base station 1100 not closely related to the technical solution of the first embodiment of the disclosure are not shown in the figure to avoid the ambiguity of the subject matter.

Specially, the storing unit 1101 is configured to store a pre-defined parameter table. As described above, the parameter table may be a CQI table, a differential CQI table or a MCS table. In addition, the parameter table may include the whole entries of a legacy parameter table and some extended entries.

The transmitting unit is configured to transmit to the UE a bitmap indication which indicates a sub-table selected from the pre-defined parameter table.

Specially, the bitmap indication may be transmitted by the eNode B to the UE via a signaling in the upper layer explicitly or in the physical layer implicitly. For example, the bitmap indication may be transmitted directly via UE-specific RRC signaling semi-statically or implicitly triggered via bits in DCI format dynamically (specific configurations are via RRC signaling).

The bitmap indication may be used for indicating the sub-table selected from the parameter table. It should be noted that the number of the entries in the sub-table may be the same as in the legacy parameter table, so that the signaling overhead related to the indication in the physical layer may be kept unchanged.

The base station 1100 may further comprise a generating unit (not shown). The generating unit is configured to generate the bitmap indication based on wireless link conditions of the user equipment in the communication system. For example, when the user equipment is at a position close to cell center, when a carrier for a secondary cell is assigned for the user equipment, or when the user equipment is in a uplink transmission, the generating unit generates the bitmap indication which indicates a sub-table including more extended entries. When the user equipment is at a position far away from cell center, when a carrier for a primary cell is assigned for the user equipment, or when the user equipment is in a downlink transmission, the generating unit generates the bitmap indication which indicates a sub-table including more legacy entries.

Those skilled in the art will understand that the bitmap indication can be generated by the generating unit based on communication scenarios other than those described above with reference to FIGS. 4-6.

In addition, the base station 1100 may further comprise an informing unit (not shown). The informing unit is configured to inform of the UE an index, such as a MCS index, of an entry based on the sub-table.

Moreover, since the extended parameter table comprises more entries than the legacy table, the base station 1100 may further comprise a re-indexing unit to re-index the entries.

Specially, for example, for the MCS table, the re-indexing unit may re-index the selected original MCS entries, so that the index length is still the same as legacy MCS table. Then, the base station 1100 may inform one of the new indices to the UE.

In addition, the base station 1100 may further comprise a restoring unit to restore the new indices to the original indices.

Specially, for example, for the CQI table, after receiving the selected new index from the UE which has been subject to the re-indexing process similar to those described above at the UE side, the restoring unit may restore the reported new index to the original CQI index based on the bitmap indication.

Figure 12:
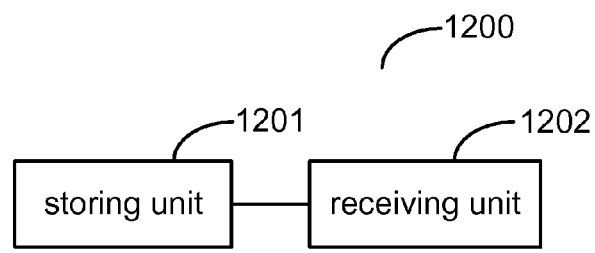
FIG. 12 is a diagram schematically showing the configuration of a user equipment according to the first embodiment of the present disclosure.

Next, refer to FIG. 12, which shows schematically the configuration of a user equipment according to the first embodiment of the present disclosure. The user equipment 1200 according to the first embodiment is used to configure a parameter table. As shown in FIG. 12, the user equipment 1200 mainly comprises a storing unit 1201 and a receiving unit 1202. Similarly, other parts of the user equipment 1200 not closely related to the technical solution of the first embodiment of the disclosure are not shown in the figure to avoid the ambiguity of the subject matter.

Specially, the storing unit 1201 is configured to store the pre-defined parameter table similar to that described with reference to FIG. 11.

The receiving unit 1202 is configured to receive from the eNode B a bitmap indication which indicates a sub-table selected from the pre-defined parameter table.

The user equipment 1200 may further comprise a reporting unit (not shown). The reporting unit is configured to report to the eNode B an index of an entry based on the sub-table.

In addition, the user equipment 1200 may further comprise a re-indexing unit to re-index the entries in the sub-table, for example, for the extended CQI table, and may further comprise a restoring unit to restore the received index to the original index, for example, for the extended MCS table. The configurations and process of the re-indexing unit and the restoring unit are similar to those in the base station 1100, and are not described here to avoid redundancy.

The communication apparatuses according to the first embodiment of the present disclosure have been described above. According to the communication apparatuses, higher modulation orders may be supported flexibly, while the signaling overhead in the physical layer may be kept unchanged, thus achieving a good backward compatibility.

(Second Embodiment)

Figure 13:
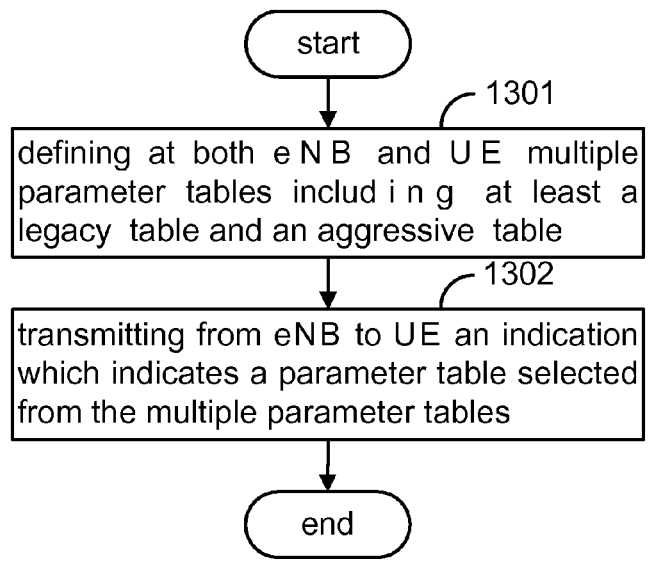
FIG. 13 is a flowchart showing an exemplary implementation of a communication method according to a second embodiment of the present disclosure.

FIG. 13 is a flowchart showing an exemplary implementation of the communication method according to the second embodiment of the present disclosure.

As shown in FIG. 13, the communication method starts at step 1301, where multiple parameter tables are defined at both the eNode B and the user equipment.

The parameter may be various communication parameters such as CQI, differential CQI and/or MCS, as described above. Correspondingly, the parameter table may be a CQI table, a differential CQI table and/or a MCS table.

Figure 14:
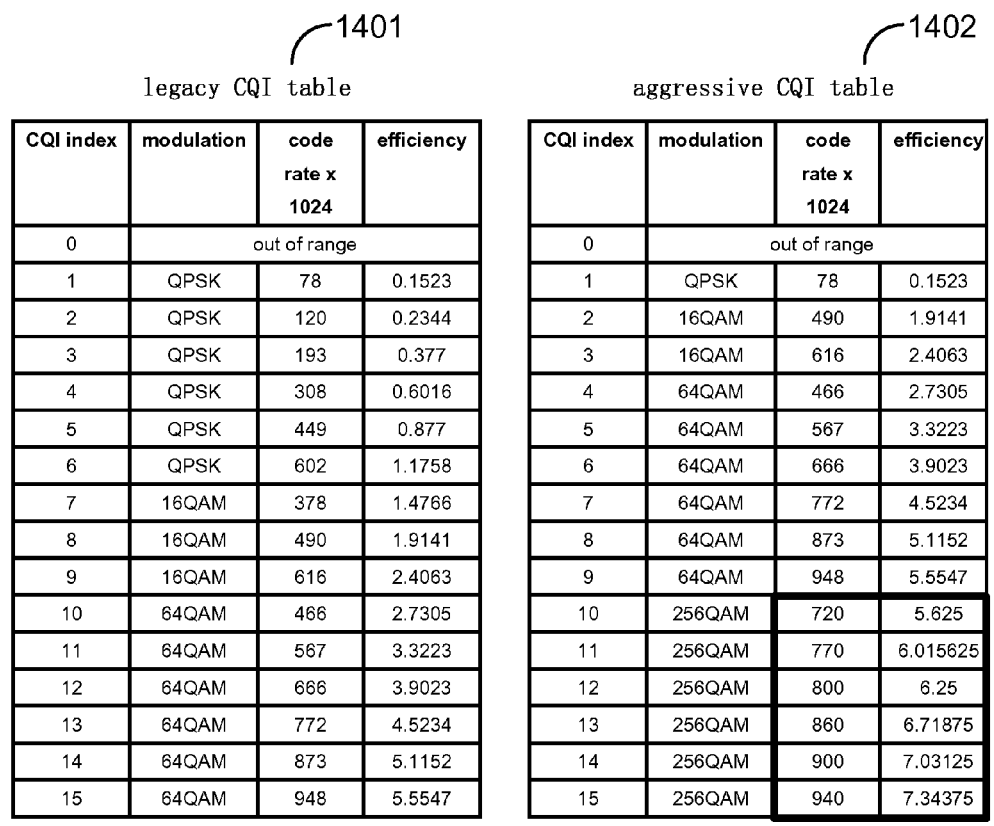
FIG. 14 is a diagram schematically showing a legacy parameter table and an aggressive parameter table according to the second embodiment of the present disclosure.

In addition, the parameter table may include at least a legacy parameter table and an aggressive parameter table which includes new modulation order related entries or new combinations of modulation order and coding rate related entries, which are shown in FIG. 14 schematically. The legacy parameter table 1401 as shown in FIG. 14 may be a table defined in standards such as 3GPP TS 36.213, and it may correspond to communication scenarios where relatively conservative modulation orders/coding rates are required. The aggressive parameter table 1402 as shown in FIG. 14 may be an extended new table, and it may correspond to communication scenarios where relatively aggressive modulation orders/coding rates are required.

Next, at step 702, eNode B transmits to UE an indication which indicates a parameter table selected from the parameter tables.

Specially, the indication may be a bit indication or a bitmap indication, and it may be transmitted by eNode B to UE via a signaling in an upper layer than the physical layer. For example, the bitmap indication may be transmitted via RRC signaling or bits in DCI format.

It should be noted that the number of entries in any one of the multiple parameter table may be the same as in the legacy parameter table, so that the signaling overhead related to the indication in the physical layer may be kept unchanged. Similarly, the indication may be generated by the eNode B based on the communication scenario of the wireless communication system.

Moreover, the multiple parameter tables may be hard-coded tables, that is, pre-defined tables in standard and the content is unchangeable. All possible tables may be specified in standard, and the eNode B will indicate the UE which table would be used for certain period semi-statically via RRC or dynamically via bits in DCI.

It should also be noted that CQI and MCS related tables could have different configurations. There is no need for CQI and MCS to always follow the same modulation order restriction. Differential CQI tables could also have different hard-coded versions and eNB indicates which tables would be used via RRC or bits in DCI format. There is another possibility that RRC signaling is used for configuration/restriction and DCI bits for triggering. For example, multiple hard-coded tables are pre-defined in standards and the RRC signaling is used to indicate which tables would be used for current configuration, then the specific table will be dynamically triggered in each transmission time interval (TTI) via bits in DCI.

With the communication method according to the second embodiment of the present disclosure, higher modulation orders may be supported flexibly, and the signaling overhead in the physical layer may be kept unchanged, thus achieving a good backward compatibility.

Hereinafter, the communication apparatus according to the second embodiment of the present disclosure will be described with reference to FIGS. 15-16. The communication apparatus may be a base station (which is also referred to as eNode B) or a user equipment (UE), and locates in a wireless communication system comprising both the base station and the UE.

Figure 15:
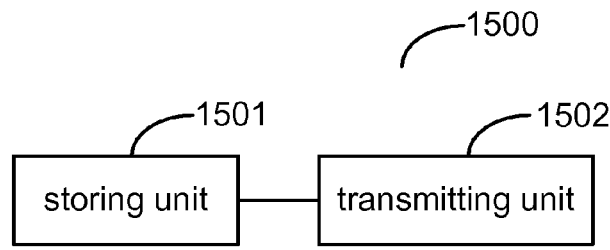
FIG. 15 is a diagram schematically showing the configuration of a base station according to the second embodiment of the present disclosure.

First, refer to FIG. 15, which shows schematically the configuration of a base station according to the second embodiment of the present disclosure. The base station 1500 according to the second embodiment mainly comprises a storing unit 1501 and a transmitting unit 1502.

Specially, the storing unit 1501 is configured to store multiple pre-defined parameter tables including at least a legacy parameter table and an aggressive parameter table which includes new modulation order related entries or new combinations of modulation order and coding rate related entries as described above. The transmitting unit 1502 is configured to transmit to the user equipment an indication which indicates a pre-defined parameter table selected from the multiple pre-defined parameter tables. The number of the entries in the selected pre-defined parameter sub-table may be the same as in the legacy parameter table, so that the signaling overhead related to the indication in the physical layer may be kept unchanged.

The other parts of the base station 1500 and the functions thereof are similar to those of the base station 1100 according to the first embodiment of the present disclosure, and will not be described here to avoid redundancy.

Figure 16:
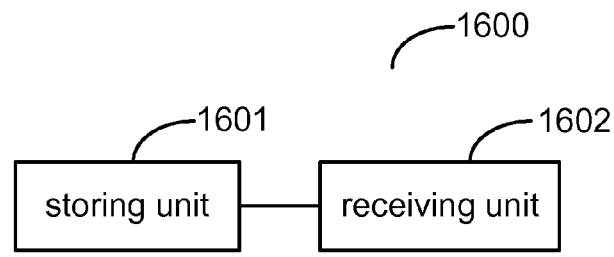
FIG. 16 is a diagram schematically showing the configuration of a user equipment according to the second embodiment of the present disclosure.

Next, refer to FIG. 16, which shows schematically the configuration of a user equipment according to the second embodiment of the present disclosure. As shown in FIG. 16, the user equipment 1600 according to the second embodiment mainly comprises a storing unit 1601 and a receiving unit 1602.

Specially, the storing unit 1601 is configured to store multiple pre-defined parameter tables similar to that described with reference to FIG. 15. The receiving unit 1602 is configured to receive from the eNode B an indication which indicates a parameter table selected from the multiple pre-defined parameter tables.

The other parts of the user equipment 1600 and the functions thereof are similar to those of the user equipment 1200 according to the first embodiment of the present disclosure, and will not be described here to avoid redundancy.

The communication apparatuses according to the second embodiment of the present disclosure have been described above. With the communication apparatuses according to the second embodiment of the present disclosure, higher modulation orders may be supported flexibly, while the signaling overhead in the physical layer may be kept unchanged, thus achieving a good backward compatibility.

(Third Embodiment)

Figure 17:
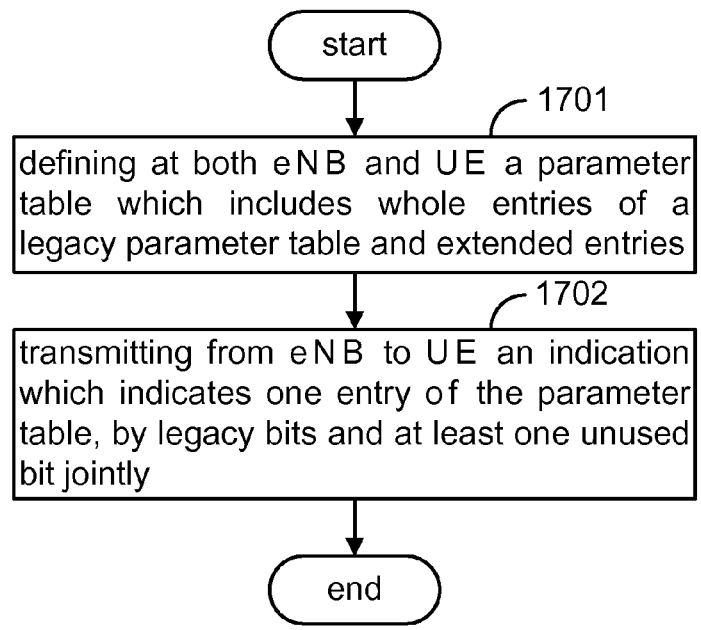
FIG. 17 is a flowchart showing an exemplary implementation of a communication method according to a third embodiment of the present disclosure.

FIG. 17 is a flowchart showing an exemplary implementation of the communication method according to the third embodiment of the present disclosure.

As shown in FIG. 17, the communication method starts at step 1701, where a parameter table similar to that in the first embodiment is defined at both the eNode B and the user equipment.

Next, at step 1702, the eNode B transmits to the UE an indication which indicates one entry of the parameter table by legacy bits and at least one unused bit jointly.

That is, the third embodiment according to the present disclosure focuses on using unused bits combining with current bits, for example, MCS bits in DCI, to indicate the extended parameter table, for example, the extended MCS table.

Specially, there is 5 bits for MCS indication in DCI format currently. Therefore, in order to indicate the extended MCS table and not impact on the current MCS bits, one option is to combine 1 bit or 2 bit of Carrier Indicator Field (CIF) with MCS bits to jointly indicate extended table (considering the typical scenario of CA is 2 CC in downlink and 1 in uplink so 1 bit is enough for the indication of carrier index and thus 2 bits are redundant, which may be used to jointly indicate MCS).

Another option is to combine unused bit in Hybrid Automatic Repeat Request (HARQ) ID with MCS bits to jointly indicate extended MCS table. How to allocate HARQ ID is pure implementation related issue in eNB. For example, only first two bits are used for indication of normal HARQ process ID so the last 1 bit could be used for other business. In this case, the eNB has flexibility to use the last bit in HARQ ID to jointly indicate MCS.

Except for the above two options, any other solutions to jointly combine unused bits with current 5 bits of MCS to indicate extended table are also applied. Which redundant bits will be used finally may be configured by UE specific RRC in the eNB.

Hereinafter, the communication apparatuses according to the third embodiment of the present disclosure will be described.

Similarly, the base station according to the third embodiment mainly comprises a storing unit and a transmitting unit. Specially, the storing unit is configured to store a pre-defined parameter table including the whole entries of a legacy parameter table and extended entries as described above. The transmitting unit is configured to transmit to the user equipment an indication which indicates one entry of the pre-defined parameter table by legacy bits and at least one unused bit jointly, so that the signaling overhead related to the indication in the physical layer is kept unchanged.

The other parts of the base station and the functions thereof are similar to those of the base station 1100 according to the first embodiment of the present disclosure, and will not be described here to avoid redundancy.

The user equipment according to the third embodiment mainly comprises a storing unit and a receiving unit. Specially, the storing unit is configured to store a pre-defined parameter table including the whole entries of a legacy parameter table and extended entries as described above. The receiving unit is configured to receive from the eNode B an indication which indicates one entry of the pre-defined parameter table by legacy bits and at least one unused bit jointly.

The other parts of the user equipment and the functions thereof are similar to those of the user equipment 1200 according to the first embodiment of the present disclosure, and will not be described here to avoid redundancy.

With the communication method and apparatuses according to the third embodiment of the present disclosure, higher modulation orders may be supported flexibly, the signaling overhead in the physical layer may be kept unchanged, thus achieving a good backward compatibility.

(Fourth Embodiment)

Figure 18:
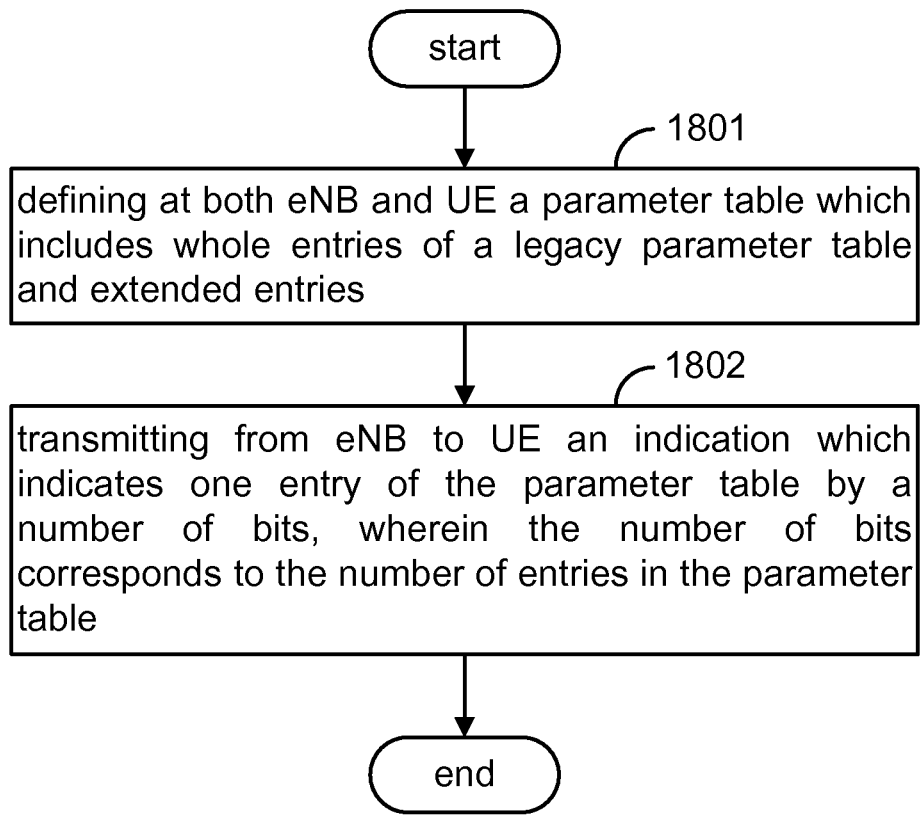
FIG. 18 is a flowchart showing an exemplary implementation of a communication method according to a fourth embodiment of the present disclosure.

FIG. 18 is a flowchart showing an exemplary implementation of the communication method according to the fourth embodiment of the present disclosure.

As shown in FIG. 18, the communication method starts at step 1801, where a parameter table similar to that in the first embodiment is defined at both the eNode B and the user equipment.

Next, at step 1802, the eNode B transmits to the UE an indication which indicates one entry of the parameter table by a number of bits, wherein the number of bits corresponds to the number of entries in the parameter table.

That is, the fourth embodiment according to the present disclosure focuses on extending the MCS bits directly in DCI format and defining a new transmission mode in standards, such as RAN1 standard. The new transmission mode may be Mode 9+ as shown in FIG. 19, wherein the modification of DCI format 2C to DCI format 2C+ is intended to extend the MCS bits from 5 to 6 or even bigger.

Correspondingly, the transmitting unit of the base station according to the fourth embodiment may be configured to transmit to the user equipment an indication which indicates one entry of the predefined parameter table by a number of bits, wherein the number of bits corresponds to the number of entries in the parameter table. The receiving unit of the user equipment according to the fourth embodiment may be configured to receive from the eNode B an indication which indicates one entry of the predefined parameter table by a number of bits, wherein the number of bits corresponds to the number of entries in the parameter table.

The other parts of the base station and the user equipment and the functions thereof are similar to those of the base station 1100 and the user equipment 1200 according to the first embodiment of the present disclosure, and will not be described here to avoid redundancy.

With the communication method and apparatuses according to the fourth embodiment of the present disclosure, higher modulation orders can be supported to adapt channel and improve spectral efficiency.

The above embodiments of the present disclosure are only exemplary description, and their specific structures and operations do not limit the scope of the disclosure. Those skilled in the art can recombine different parts and operations of the above respective embodiments to produce new implementations which equally accord with the concept of the present disclosure.

The embodiments of the present disclosure may be implemented by hardware, software and firmware or in a combination thereof, and the way of implementation does not limit the scope of the present disclosure.

The connection relationships between the respective functional elements (units) in the embodiments of the disclosure do not limit the scope of the present disclosure, in which one or multiple functional element(s) or unit(s) may contain or be connected to any other functional elements.

Although several embodiments of the present disclosure has been shown and described in combination with attached drawings above, those skilled in the art should understand that variations and modifications which still fall into the scope of claims and their equivalents of the present disclosure can be made to these embodiments without departing from the principle and spirit of the disclosure.

What is claimed is:

1. A communication method performed by a user equipment, the communication method comprising:
    determining a selected Channel Quality Indicator for (CQI table, from a legacy CQI parameter table and an aggressive CQI parameter table, based on a received indication, the aggressive CQI parameter table including combinations of higher modulation scheme and higher coding rate than the legacy CQI parameter table;
    determining a selected Modulation and Coding Scheme (MCS) table, from a legacy MCS parameter table and an aggressive MCS parameter table, to be used with the selected CQI table as a set, the aggressive MCS parameter table including combinations of higher modulation order and higher coding rate than the legacy MCS parameter table; and
    controlling communication based on one of the combinations of modulation scheme and coding rate corresponding to a CQI index in the selected CQI table and based on one of the combinations of modulation order and coding rate corresponding to a MCS index in the selected MCS table;
    wherein,
    the set of the selected CQI table and the selected MCS table is one of sets including a first set of the aggressive CQI parameter table and the legacy MCS parameter table and a second set of the legacy CQI parameter table and the aggressive MCS parameter table, and
    a number of bits that indicate the CQI index in the aggressive CQI parameter table equals a number of bits that indicate the CQI index in the legacy CQI parameter table, and a number of bits that indicate the MCS index in the aggressive MCS parameter table equals a number of bits that indicate the MCS index in the legacy MCS parameter table.

2. The communication method of claim 1, wherein:
the legacy MCS parameter table is selected in Downlink Control Information (DCI) format 1A transmission.

3. The communication method of claim 1, wherein:
the legacy MCS parameter table is selected in a defined initial state or in a defined handover state.

4. The communication method of claim 1, wherein:
different carrier components have different configurations of at least one of the selected CQI table and the selected MCS table.

5. The communication method of claim 1, wherein:
the legacy MCS parameter is configured for a primary cell and the aggressive MCS parameter is configured for a secondary cell.

6. A user equipment comprising:
    a storage which, in operation, stores two or more Channel Quality Indicator (CQI) tables including a legacy CQI parameter table and an aggressive CQI parameter table, the aggressive CQI parameter table including combinations of higher modulation scheme and higher coding rate than the legacy CQI parameter table, and two or more Modulation and Coding Scheme (MCS) tables including a legacy MCS parameter table and an aggressive MCS parameter table, the aggressive MCS parameter table including combinations of higher modulation order and higher coding rate than the legacy MCS parameter table; and
    a controller which, in operation, determines a selected CQI table based on a received indication, determines a selected MCS table to be used with the selected CQI table as a set, and controls communication based on one of the combinations of modulation scheme and coding rate corresponding to a CQI index in the selected CQI table and based on one of the combinations of modulation order and coding rate corresponding to a MCS index in the selected MCS table;
    wherein,
    the set of the selected CQI table and the selected MCS table is one of sets including a first set of the aggressive CQI parameter table and the legacy MCS parameter table and a second set of the legacy CQI parameter table and the aggressive MCS parameter table, and
    a number of bits that indicate the CQI index in the aggressive CQI parameter table equals a number of bits that indicate the CQI index in the legacy CQI parameter table, and a number of bits that indicate the MCS index in the aggressive MCS parameter table equals a number of bits that indicate the MCS index in the legacy MCS parameter table.

7. The user equipment of claim 6, wherein:
the controller, in operation, determines the legacy MCS parameter table is the selected MCS table in Downlink Control Information (DCI) format 1A transmission.

8. The user equipment of claim 6, wherein:
the controller, in operation, determines the legacy MCS parameter is the selected MCS table in a defined initial state or in a defined handover state.

9. The user equipment of claim 6, wherein:
different carrier components have different configurations of at least one of the selected CQI table and the selected MCS table.

10. The user equipment of claim 6, wherein:
the controller, in operation, determines the legacy MCS parameter table is the selected MCS table for a primary cell.

11. The user equipment of claim 6, wherein:
the controller, in operation, determines the aggressive MCS parameter is the selected MCS table for a secondary cell.

12. A communication method performed by a base station, the communication method comprising:
selecting Channel Quality Indicator for (CQI) table, from a legacy CQI parameter table and an aggressive CQI parameter table, the aggressive CQI parameter table including combinations of higher modulation scheme and higher coding rate than the legacy CQI parameter table;
selecting a Modulation and Coding Scheme (MCS) table, from a legacy MCS parameter table and an aggressive MCS parameter table, to be used with the selected CQI table as a set, the aggressive MCS parameter table including combinations of higher modulation order and higher coding rate than the legacy MCS parameter table; and
controlling communication based on one of the combinations of modulation scheme and coding rate corresponding to a CQI index in the selected CQI table and based on one of the combinations of modulation order and coding rate corresponding to a MCS index in the selected MCS table;
wherein,
the set of the selected CQI table and the selected MCS table is one of sets including a first set of the aggressive CQI parameter table and the legacy MCS parameter table and a second set of the legacy CQI parameter table and the aggressive MCS parameter table, and
a number of bits that indicate the CQI index in the aggressive CQI parameter table equals a number of bits that indicate the CQI index in the legacy CQI parameter table, and a number of bits that indicate the MCS index in the aggressive MCS parameter table equals a number of bits that indicate the MCS index in the legacy MCS parameter table.

13. The communication method of claim 12, wherein:
the legacy MCS parameter table is selected in Downlink Control Information (DCI) format 1A transmission.

14. The communication method of claim 12, wherein:
the legacy MCS parameter table is selected in a defined initial state or in a defined handover state.

15. The communication method of claim 12, wherein:
different carrier components have different configurations of at least one of the selected CQI table and the selected MCS table.

16. The communication method of claim 12, wherein:
the legacy MCS parameter table is configured for a primary cell.

17. The communication method of claim 12, wherein:
the aggressive MCS parameter is configured for a secondary cell.

* * * * *